(12) United States Patent
Sherony et al.

(10) Patent No.: US 7,565,231 B2
(45) Date of Patent: Jul. 21, 2009

(54) CRASH PREDICTION NETWORK WITH GRADED WARNING FOR VEHICLE

(75) Inventors: Rini Sherony, Ann Arbor, MI (US);
Risto P. Miikkulainen, Austin, TX (US);
Kenneth O. Stanley, Orlando, FL (US);
Nathaniel F. Kohl, Austin, TX (US)

(73) Assignees: The Board of Regents, The University of Texas System, Austin, TX (US);
Toyota Motor Engineering & Manufacturing North America, Inc., Erlanger, KY (US)

( * ) Notice: Subject to any disclaimer, the term of this patent is extended or adjusted under 35 U.S.C. 154(b) by 469 days.

(21) Appl. No.: 11/386,125

(22) Filed: Mar. 22, 2006

(65) Prior Publication Data
US 2007/0073463 A1   Mar. 29, 2007

Related U.S. Application Data

(60) Provisional application No. 60/664,390, filed on Mar. 23, 2005.

(51) Int. Cl.
*B60R 22/00* (2006.01)
*G06F 15/18* (2006.01)

(52) U.S. Cl. .................... 701/45; 701/96; 701/301; 340/903; 706/21

(58) Field of Classification Search ............. 701/45, 701/93, 96, 300, 301; 340/435, 436, 438, 340/903; 706/21
See application file for complete search history.

(56) References Cited

U.S. PATENT DOCUMENTS

| | | | |
|---|---|---|---|
| 6,405,132 B1 | 6/2002 | Breed et al. | |
| 6,487,500 B2 * | 11/2002 | Lemelson et al. | 701/301 |
| 6,609,053 B1 * | 8/2003 | Breed | 701/45 |
| 7,142,130 B2 * | 11/2006 | Mukaiyama | 340/937 |
| 2003/0139865 A1 * | 7/2003 | Prakah-Asante et al. | 701/45 |

* cited by examiner

*Primary Examiner*—Tan Q Nguyen
(74) *Attorney, Agent, or Firm*—Gifford, Krass, Spinkle, Anderson & Citkowski, P.C.

(57) ABSTRACT

A method for facilitating the avoidance of a vehicle collision with an object includes the following steps: a) providing a neural network, b) evolving a good driver, c) evolving a crash predictor, and d) outputting a graded warning signal.

17 Claims, 3 Drawing Sheets

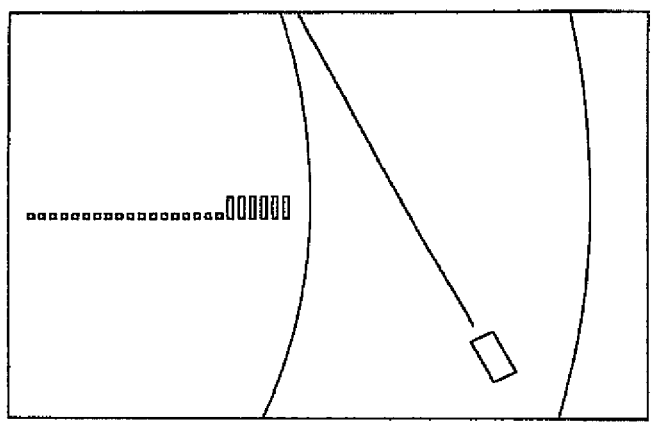
FIG.6A
FIG.6B
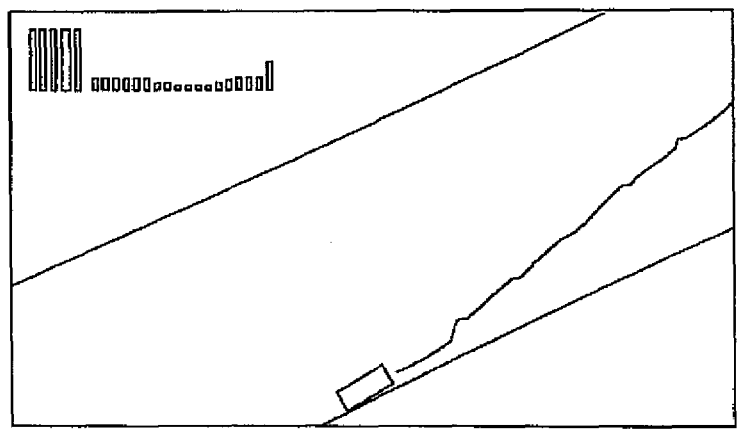
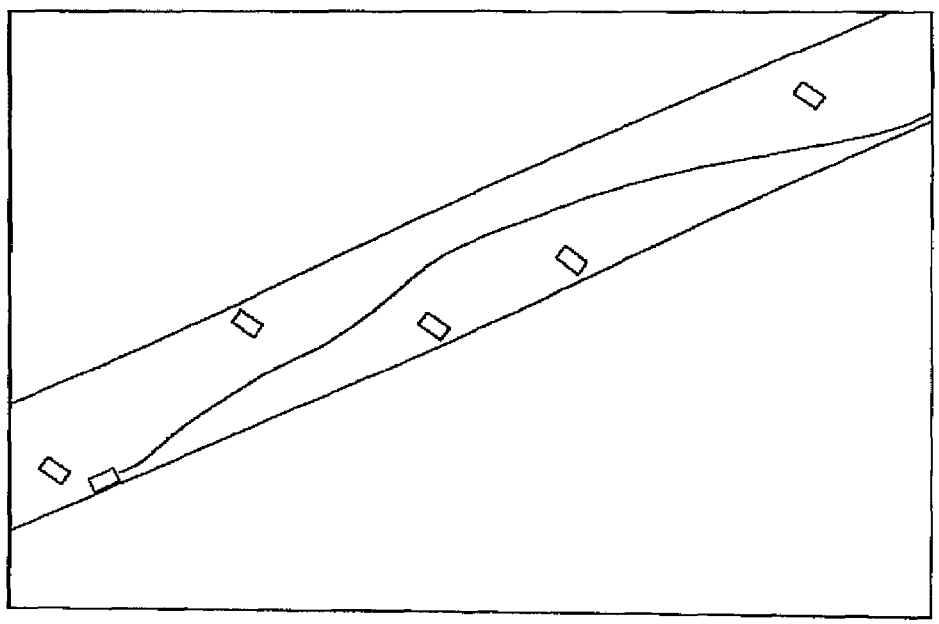
FIG.7

CRASH PREDICTION NETWORK WITH GRADED WARNING FOR VEHICLE

RELATED APPLICATION

This application claims priority of U.S. Provisional Patent Application Ser. No. 60/664,390 filed Mar. 23, 2005, which is incorporated herein by reference.

FIELD OF THE INVENTION

The invention relates to crash prevention networks and with more particularity to a crash prevention networks having a graded warning.

BACKGROUND OF THE INVENTION

Traditional collision detection and warning is complicated and difficult to achieve with high accuracy. Usually the sensors (primarily radar and vision) need to detect objects, classify them (for vision based sensors) and then provide warning. Usually detection and classification (labeling of objects) can be erroneous in the presence of occlusion and bad weather.

If cars could warn their drivers of an imminent crash without the need for accurately detecting and classifying objects every time that would improve the system and help reduce accidents. One artificial intelligence based approach is that the system learns based on circumstances and previous experience and provides warning without the need for detection and classification each time. One option for building such a warning system is to ask an expert to describe as many dangerous situations as possible and formalize that information in an automated reasoner that reacts to sensors on the car. However, the circumstances leading to a crash are frequently subtle and may vary for different drivers. Moreover, it may not be possible to predict a crash from a static snapshot of the road. The recent history of the car and other objects on the road may have to be taken into account, as well. It is difficult to know how long such a history should be or what it should be tracking. Yet if the car could learn on its own what to track and how long to keep salient events in memory, these challenges could be overcome. In addition, cars could be trained with different drivers under different circumstances, creating more flexible warning systems.

There is therefore a need in the art for an improved crash detection network to enable a vehicle to learn to predict crashes without extensive training.

SUMMARY OF THE INVENTION

A method for facilitating the avoidance of a vehicle collision with an object includes the following steps: a) providing a neural network, b) evolving a good driver, c) evolving a crash predictor, and d) outputting a graded warning signal.

BRIEF DESCRIPTION OF THE DRAWINGS

FIG. 6A is a diagram of SARS display of a car going off the road;

FIG. 6B is a diagram of SARS display during skidding;

FIG. 7 is a diagram of a SARS display having multiple objects in the way of a driven vehicle.

DETAILED DESCRIPTION OF THE PREFERRED EMBODIMENTS

Figure 1A:
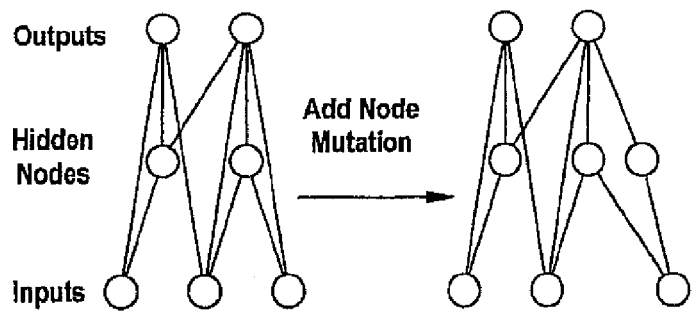
FIG. 1A is a diagram of a NEAT network in an add node mutation.

An artificial intelligence based approach to a crash prediction network allows the system to learn based on circumstances and previous experiences and provides warning without the need for accurate detection and classification of an object each time. Such an approach provides a lesser number of computational steps involved, so processing time is less and potentially have less chances of error. Additionally such an approach does not need to have the actual object in the vehicle's path for warning, but warning prediction is done based on the situation/correlation between events, so prediction for time to collision could be longer giving more reaction time to the driver.

The NeuroEvolution of Augmenting Topologies (NEAT)] method for evolving artificial neural networks is used to evolve collision prediction networks. NEAT is an appropriate choice for the learning method because NEAT can develop arbitrary recurrent neural networks that keep a variable length of prior history in memory. That means, an expert does not need to decide how long the warning window should be or what it should take into account, because the recurrent topology can evolve to make this determination on its own. Because NEAT matches the complexity of the neural network to the complexity of the task, it can find the right level of representation for warning under different conditions. If NEAT is to evolve crash predicting networks, it must be trained by observing driving behavior. In reality it would be hard to find a driver who would be willing to provide the hundreds or thousands of examples necessary to train a warning network. Conveniently, NEAT can evolve the drivers in simulation before it evolves warning networks.

NeuroEvolution (NE) is a combination of neural networks and genetic algorithms where genetic algorithm is used to train artificial neural networks. NE searches for neural networks that optimize some performance measure. NE can search for virtually any kind of neural network whether it is simple feed forward, recurrent, or even adaptive networks. The chromosomes in NE can represent any parameter of neural networks, from the connection weights to the topology to the activation functions.

While some NE methods evolve only the connection weights of the network, Topology and Weight Evolving Neural Networks (TWEANNs) evolve both weights and network topologies. Fixed-topology methods require a human to decide the right topology for a problem. In contrast, TWEANNs can discover the right topology on their own. In addition, topology evolution can be used to increase efficiency by keeping networks as small as possible, which is a strategy employed by NEAT. Therefore, TWEANNs are an important class of NE methods and they face several specific challenges and difficulties that fixed-topology NE methods do not. Searching in too large a space, i.e. a space of highly complex networks would be intractable, while searching in too simple a space would limit solution quality. Moreover, it is not known how many or where recurrent connections should exist in the network to allow it to react to past states.

Therefore, the NeuroEvolution of Augmenting Topologies (NEAT) method, which automatically evolves network topology to fit the complexity of the problem, is appropriate for these tasks. NEAT combines the usual search for the appropriate network weights with complexification of the network structure. This approach is highly effective: NEAT outperforms other neuroevolution (NE) methods in bench mark tasks. In addition, because NEAT starts with simple networks and expands the search space only when beneficial, it is able to find significantly more complex controllers than fixed-topology evolution. These properties make NEAT an attractive method for evolving neural networks in complex tasks.

Figure 1B:
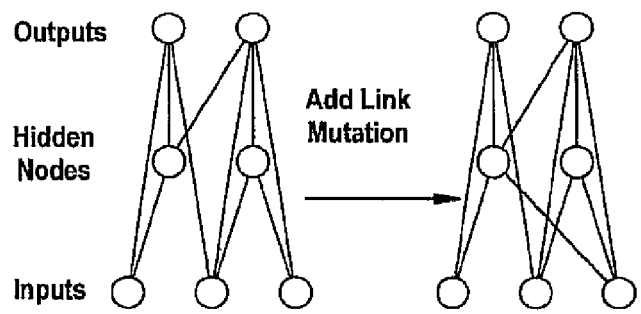
FIG. 1B is a diagram of a NEAT network in an add link mutation.

NEAT is based on three key ideas. The first being, evolving network structure requires a flexible genetic encoding. Each genome in NEAT includes a list of connection genes, each of which refers to two node genes being connected. Each connection gene specifies the in-node, the out-node, the weight of the connection, whether or not the connection gene is expressed (an enable bit), and an innovation number, which allows finding corresponding genes during crossover. Mutation can change both connection weights and network structures, as shown in FIG. 1. Connection weights mutate as in any NE system, with each connection either perturbed or not. Structural mutations, which allow complexity to increase, either add a new connection or a new node to the network. Through mutation, genomes of varying sizes are created, sometimes with completely different connections specified at the same positions. Each unique gene in the population is assigned a unique innovation number, and the numbers are inherited during crossover. Innovation numbers allow NEAT to perform crossover without the need for expensive topological analysis. Genomes of different organizations and sizes stay compatible throughout evolution, and the problem of matching different topologies is essentially avoided.

Second, NEAT speciates the population, so that individuals compete primarily within their own niches instead of within the whole population. This way, topological innovations are protected and have time to optimize their structure before they have to compete with other niches in the population. The reproduction mechanism for NEAT is fitness sharing, where organisms in the same species must share the fitness of their niche, preventing any one species from taking over the population.

Third, unlike other systems that evolve network topologies and weights, NEAT begins with a uniform population of simple networks with no hidden nodes. New structure is introduced incrementally as structural mutations occur, and only those structures survive that are found to be useful through fitness evaluations. This way, NEAT searches through a minimal number of weight dimensions and finds the appropriate complexity level for the problem.

In the method of the present invention, NEAT is used to train both drivers and crash predictors.

Figure 2:
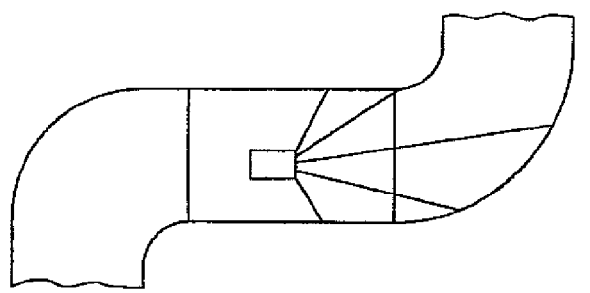
FIG. 2 is a diagram of rangefinder sensor.

Since learning requires experience, it is necessary for NEAT to gain experience through driving and predicting crashes. While crashing cars in the real world would be dangerous and expensive, a reasonable alternative used is to evaluate NEAT in simulation. RARS, a public domain racing simulator designed for artificial intelligence testing and real-time control, was chosen for this purpose. Vehicle dynamics are accurately simulated, including skidding and traction. Multiple automobiles controlled by different automated drivers can race at the same time. The software automatically provides information like the distance between the driver and other vehicles and the direction of the road that can be used as the basis for simulated sensors. RARS driving data was converted into a rangefinder sensor representation that was provided to the neural network to sense road edges, as shown in FIG. 2. Rangefinder sensors project rays at several angles relative to the car's heading to the edge of the road. The rangefinders give the car an indication of its position and heading relative to the sides of the road and also of the curvature of the road. RARS provides a virtual gas pedal, break, and steering. Rangefinder sensors detect the border of the road. Simulated rangefinders project lines to the edges of the road and measure the distance to the intersections, giving the car a sense of its position and the road's curvature. RARS' original data structures were converted into rangefinder data so that NEAT could train neural networks with a realistic egocentric input.

The method of the present invention provides for the evolution of a good driver using the NEAT method. An example of an evolution of an open road drivers with seven rangefinders sensors was performed in experimentation of the method of the present invention. During evolution, each neural network in the population was evaluated over three trials and each trial tested 1000 simulated time steps to go around the track in the simulator once. The network's fitness was the average score over three trials. The score for a single trial is calculated in proportion to a distance traveled and a damage incurred over time spent off the track. For example, the fitness may be calculated by the formula, $$S=2d-b$$

Where b is the damage incurred over time spent off the track, and d is the distance traveled. The fitness function penalizes crashing and rewards speed. It should be realized that many other formulas may be used to calculate a fitness using the distance traveled and damage. Damage is proportional to time off the track.

In order to evolve warning networks we need drivers. One can either evolve the drivers in simulation or use human drivers to drive the vehicles in RARS using a joystick. In one application of the method of the present invention we generated open road drivers in simulation that drove perfectly in an open road and then the weights of the associated networks were slightly changed to generate many imperfect/variation in driving behavior or different drivers. In simulation the weights of the best driver were perturbed using uniform random noise between −0.4 and 0.4 to create many drivers that could still navigate in the track, but occasionally makes wrong decisions and then crashes, making them good training drivers to warn of impending crashes.

After generating different drivers, then the crash predictor outputs a prediction about whether and when a crash is going to happen instead of outputting actual driving control requests. This prediction must be based on what the driver has been doing over some time leading up to the present. If the predictor has a good model of the driver's behavior, it can make realistic predictions about what the driver is likely to do in potentially dangerous situations. NEAT is automatically making this determination by evolving the recurrent networks. One advantage of neuroevolution over supervised methods is that because neuroevolution does not rely on training targets, networks can be trained to bias their errors in the least costly direction. For example, losing a life is more costly than a false alarm, so networks can be rewarded or penalized accordingly. In supervised learning, the relative importance of different kinds of errors is difficult to incorporate into training.

Figure 3:
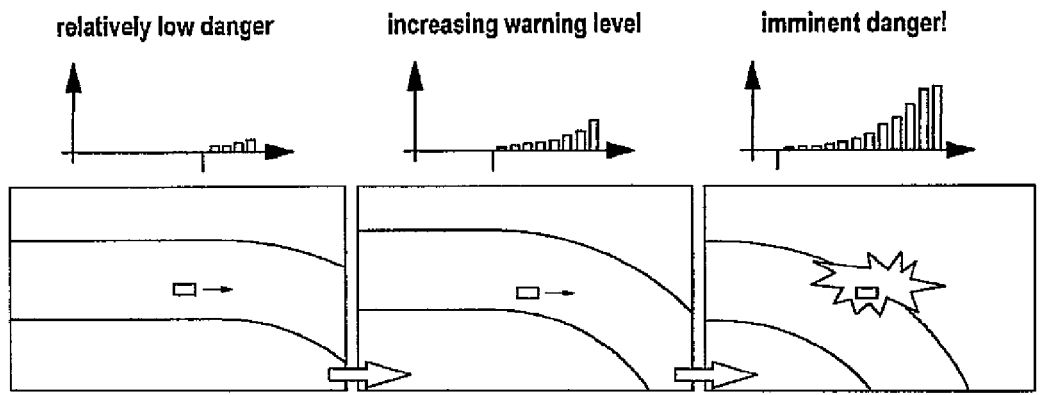
FIG. 3 is a diagram of a graded warning output.

The simplest kind of prediction is a binary output that decides whether or not a crash will happen in some fixed number of time steps. While such a system is useful, a more sophisticated prediction can be made if the network also determines when it expects the crash. By predicting a time, the network is in effect constantly outputting a danger level, i.e. the sooner the predicted crash, the more dangerous the situation. Such a graded warning system, such as depicted in FIG. 3, would be more useful to human drivers. Therefore the method of the present invention includes evolving a crash predictor to make temporal predictions of this type.

The crash predictor of the method of the present invention is evolved to include a temporal element. The crash predictor network is given the same inputs as the drivers described above. Instead of outputting driving control, the crash predictor outputs a prediction about whether and when a crash is going to happen. The network receives the same rangefinder input when evolving a good driver, as previously described. The output is a predicted time to crash between zero (i.e., imminent crash) and a maximum time m. When the network outputs a maximum value it indicates no present danger.

The output of the neural network is used to calculate a temporal value or predicted time to crash. For example, the network may haves three outputs that are combined to produce a time, which is interpreted as predicted time to crash. The three outputs $O_1$, $O_2$, and $O_3$, are combined to produce a single time-to-crash T according to:

$$T = 3\ O_1/O_{min} + 10\ O_2/O_{min} + 17 O_3/O_{min}$$

where $O_{min}$ is the minimum output value. This method allows the network to interpolate predictions between 3 and 17 RARS time steps in the future. Although an example of a temporal time equation is presented, it should be realized that other formulas and outputs of a neural network may be used by the present invention. The three coefficients 3, 10 and 17 proved to provide a reliable warning after several trial and errors. Only outputs above 0.5 are included in the sum; any output below 0.5 is interpreted as 0 and discarded. The network can indicate no crash by outputting all three values below 0.5. At every time step, the network output is pushed onto a prediction queue, which becomes a moving list of past predictions. If a crash happens, the prediction queue has low-level warnings further back in time and high-level warnings more recently, as shown in FIG. 3. As can be seen in FIG. 3, the most recent warning appears on the right of the queue and the higher bars represent increasing urgency. As the car moves closer to crashing into the side of the road, the warning bars increase in size. This provides a graded warning to a driver.

The fitness of a particular network is calculated to determine if that network should be retained. The fitness may computed by accumulating a total reward $R_{tot}$ during evaluation. $R_{tot}$ is the fitness of the entire evaluation including all crashes and predictions. During an evaluation, $R_{tot}$ is modified at each time step in one of two cases:

1) If the car crashes, $R_{tot}$ increases according to how close the actual prediction queue is to the ideal prediction queue,
2) If the car does not crash, a small bonus is added to $R_{tot}$ if the oldest prediction in the queue was that no crash would occur.

Figure 4:
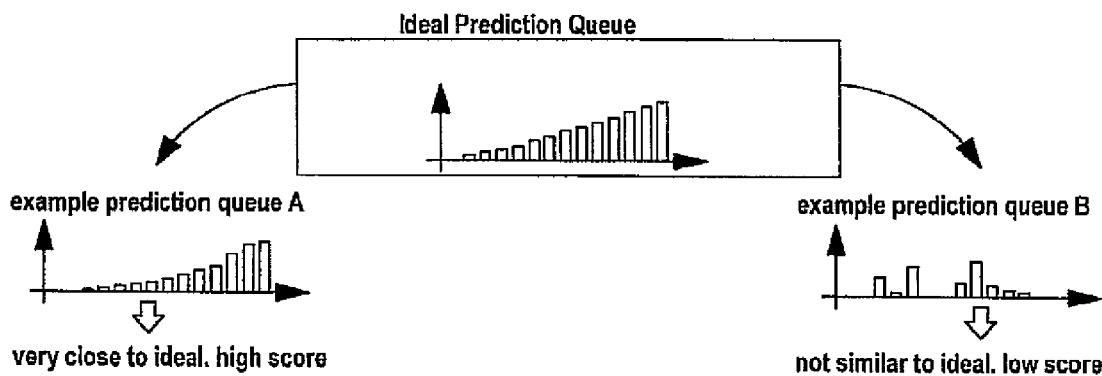
FIG. 4 is a diagram of a comparison of the ideal queue to an output-queue.

Referring to FIG. 4, there is shown an example of two prediction queues being compared to an ideal queue. Since queue A is closer to the ideal than B, A would receive a higher reward. Comparing prediction queues in this way makes it possible to reward temporal predictions about when a crash is expected to occur.

In one aspect of the present invention and as an example, when a crash occurs, the prediction queue is compared with the ideal queue to produce a reward function. The queue may hold 25 predictions $q_1$, to $q_{25}$. Upon crashing, each of the 25 predictions is compared to the ideal prediction, $I_L$, where $1 \leq L \leq 25$, to produce a reward R according to the following formula:

$$R = \Sigma_t^{25}{}_{=1} 25 - |q_t - I_L|/25$$

wherein $q_t$ is a prediction in the queue and $I_L$ is an ideal prediction.

R is then added to the accumulated reward $R_{tot}$. In addition, if the queue is over 25 time steps long, the oldest prediction is taken off the cue. If the oldest prediction was that the car would not crash, a reward of 0.05 is added to $R_{tot}$. Otherwise, if it wrongly predicted a crash, the network does not receive a reward. At the end of the evaluation, $R_{tot}$ is assigned as the network's fitness. It should be realized that the above example provides one example of a reward formula and the present invention may use other reward calculations or assigned relative values to favor desired characteristics.

The fitness may also be calculated by the following formula where $I_t$ is the ideal prediction at time step t and $O_t$ is the prediction output by the network. In the event a crash is more than m time steps in the future, $I_t$ is set to m. The average error $\overline{E}$ (Measure of the fitness) over a run of n time steps is:

$$\overline{E} = \Sigma^n_{t=1} (O_t - I_t)^2/n$$

Figure 5:
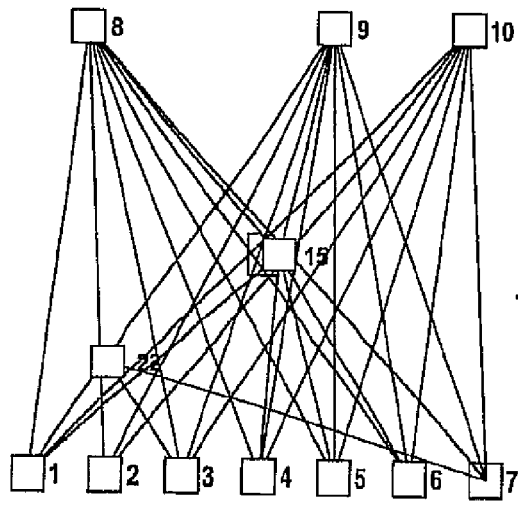
FIG. 5 is a diagram of a neural network.

By using a prediction queue, NEAT was able to evolve networks that could vary their warning level and evolution could determine on its own how far back in the past relevant information should be saved in recurrent connections. FIG. 5 shows such a successful warning network. This small network was able to make accurate predictions about crashing with minimal topology. The recurrent loop on node 15 and the connections between outputs give the network a rudimentary memory for events in the past. This memory allows it to predict crashes after events like skidding that can only be detected by considering the recent past positions of the car.

In some cases, the warning network predicted crashes that could not be predicted only from the current state of the car. For example, when the car skids into the side of the road its heading is in a direction that could be interpreted as safe. Yet the evolved network still predicts a crash, showing that it is using memory to integrate a sequence of states into its prediction. The warning system can also be evaluated subjectively by having a human drive the car with the warning system on. Human drivers generally find the warnings accurate and helpful. Referring to FIG. 6 there is shown actual prediction queues generated in real-time during human-controlled driving tests in RARS. The above screenshots were taken while a human was controlling the car. The real-time prediction queues are in the upper left corner of each box, with the most recent prediction on the right. White bars signify no warning, and the height of dark bars represents the seriousness of the warning. (A) As the car drives directly into the side of a turn, the warning switches from mild to severe. (B) Judging by the car's heading alone, there would be no reason to predict a crash in this scenario. However, as can be seen by the white trajectory line preceding the car, it has been skidding sideways for some time. The predictor network was able to make the right warning by observing the trajectory of the car over time.

In addition to the open road driver described above, the method of the present invention may be used to evolve drivers and warning networks over many different driving conditions. For example, adding other cars makes the task more realistic and complex. This task is more difficult than evolution on the open road because with other cars on the road it is difficult to ensure the driver will encounter other cars on every evaluation. If some networks encounter cars and some do not, an evaluation would be noisy, which might interfere with evolution. One solution is to place stationary cars at several different positions so that the only way to avoid them is to drive around them. That way, evolution is forced to evolve controllers that can react to other vehicles. Avoiding stationary vehicles, or obstacles, is a special case of the general problem of avoiding other drivers.

Figure 8:
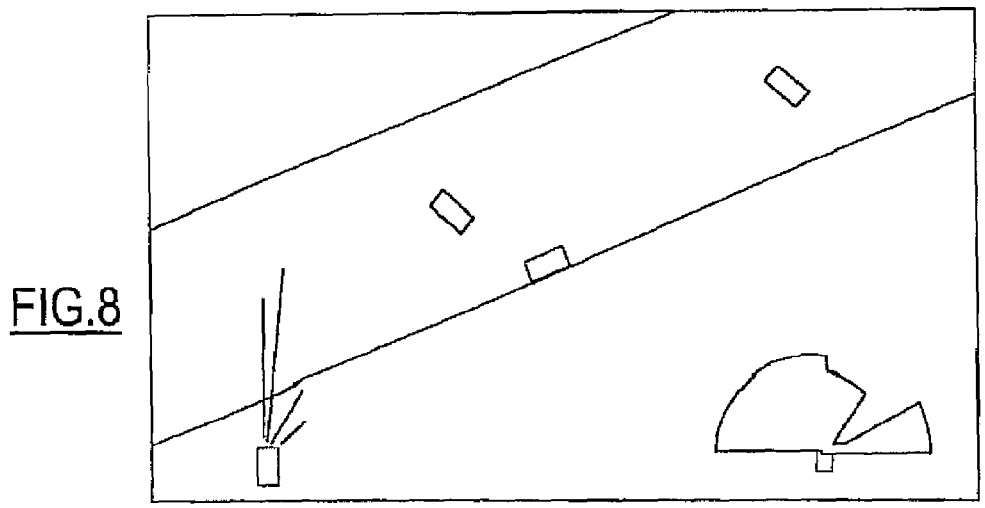
FIG. 8 is diagram of a SARS display including a warning signal.

NEAT was able to evolve drivers and warning networks that avoid other cars in this manner. The driving network weaves around several obstacles like real cars avoiding cones in an obstacle course. Referring to FIG. 7, the trajectory of the evolved driver is depicted as a white line on the road. The driver weaves skillfully around parked cars that are blocking the road. This driver can avoid randomly placed fixed obstacles 100% of the time over 100 test trials with cars placed at different random positions. At the same time, the warning network learns to warn when the driver gets too close to these obstacles, as shown in FIG. 8. The warning signal in FIG. 8 is represented by the line which may have a different amplitude or magnitude depending on the proximity of a vehicle to an object and the time before collision with the object.

In addition to the online training using the SARS simulator the method of the present invention may utilize offline training using actual drivers within the SARS system. Both online and offline training is sufficient to evolve accurate networks for the method of the present invention.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A method for facilitating the avoidance of a vehicle collision with an object comprising the steps of:
   a) providing a neural network;
   b) evolving a good driver wherein the step of evolving a good driver includes the steps of:
      e) providing a biasing input;
      f) generating sensory signals;
      g) inputting the sensory signals and biasing input to the neural network;
      h) calculating a reward value;
      i) calculating a fitness value determining the retention of the neural network;
      j) repeating steps e-i a plurality of times;
   c) evolving a crash predictor;
   d) outputting a graded warning signal.

2. The method of claim 1 wherein the biasing input is 1.

3. The method of claim 1 wherein the sensory signals are rangefinder data signals.

4. The method of claim 3 wherein the rangefinder data signals are converted from simulated driving data.

5. The method of claim 1 wherein the fitness is calculated in proportion to a distance traveled and a damage incurred over time spent off the road.

6. The method of claim 1 wherein the steps e-h are repeated 1000 times for a single trial.

7. The method of claim 6 including a plurality of trials.

8. A method for facilitating the avoidance of a vehicle collision with an object comprising the steps of:
   a) providing a neural network;
   b) evolving a good driver;
   c) evolving a crash predictor wherein the step of evolving a crash predictor includes the steps of:
      j) calculating a biasing input
      k) generating sensory signals;
      l) inputting the sensory signals and biasing input to the neural network;
      m) calculating a temporal value;
      n) inputting the calculated temporal value into a queue;
      o) providing an ideal temporal queue;
      p) determining if a crash occurs;
      q) calculating a reward value
      r) calculating a fitness value determining the retention of the neural network;
      s) repeating steps k-r a plurality of times;
   d) outputting a graded warning signal.

9. The method of claim 8 wherein the biasing input is 1.

10. The method of claim 8 wherein the sensory signals are rangefinder data signals.

11. The method of claim 10 wherein the rangefinder data signals are converted from simulated driving data.

12. The method of claim 8 wherein the temporal value is calculated from an output of the neural network.

13. The method of claim 8 wherein the reward value is calculated according to the formula:

$$R = \Sigma_t{}^{25}{}_{=1} 25 - |q_t - I_L|/25$$

Wherein $q_t$ is a prediction in the queue and $I_L$ is an ideal prediction where $1<L<25$.

14. The method of claim 8 wherein the reward is assigned a relative value such that desirable characteristics are favored in the neural network.

15. The method of claim 8 wherein the fitness is computed by accumulating a total reward $R_{tot}$ equaling the fitness of the entire evaluation including all crashes and prediction sand wherein $R_{tot}$ is modified at each time step in one of two cases:
   1) If the car crashes, $R_{tot}$ increases according to how close the actual prediction queue is to the ideal prediction queue, and
   2) If the car does not crash, a small bonus is added to $R_{tot}$ if the oldest prediction in the queue was that no crash would occur.

16. The method of claim 3 wherein the fitness is calculated according to the formula:

$$\overline{E} = \Sigma^n{}_{t=1}(O_t - I_t)^2/n$$

wherein $\overline{E}$ is an average error over n timesteps, $I_t$ is an ideal prediction at time step t and $O_t$ is a prediction output.

17. A method for facilitating the avoidance of a vehicle collision with an object comprising the steps of:
   a) providing a neural network;
   b) evolving a good driver including the steps of:
      i) providing a biasing input;
      ii) generating sensory signals;
      iii) inputting the sensory signals and biasing input to the neural network;
      iv) calculating a reward value;
      v) calculating a fitness value determining the retention of the neural network;
      vi) repeating steps e-i a plurality of times;
   c) evolving a crash predictor including the steps of:
      vii) calculating a biasing input
      viii) generating sensory signals;
      ix) inputting the sensory signals and biasing input to the neural network;
      x) calculating a temporal value;
      xi) inputting the calculated temporal value into a queue;
      xii) providing an ideal temporal queue;
      xiii) determining if a crash occurs;
      xiv) calculating a reward value
      xv) calculating a fitness value determining the retention of the neural network;
      xvi) repeating steps k-r a plurality of times; and
   d) outputting a graded warning signal.

* * * * *